United States Patent
Batra et al.

(10) Patent No.: US 10,001,925 B2
(45) Date of Patent: *Jun. 19, 2018

(54) METHOD TO IMPROVE PAGE OUT MECHANISM WITH COMPRESSED MEMORY POOLS

(71) Applicant: International Business Machines Corporation, Armonk, NY (US)

(72) Inventors: Gaurav Batra, Cedar Park, TX (US); Sreenivas Makineedi, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 6 days.

This patent is subject to a terminal disclaimer.

(21) Appl. No.: 14/735,308

(22) Filed: Jun. 10, 2015

(65) Prior Publication Data

US 2016/0179400 A1    Jun. 23, 2016

Related U.S. Application Data

(63) Continuation of application No. 14/576,255, filed on Dec. 19, 2014.

(51) Int. Cl.
| | |
|---|---|
| *G06F 12/00* | (2006.01) |
| *G06F 3/06* | (2006.01) |
| *G06F 12/08* | (2016.01) |
| *G06F 9/445* | (2018.01) |

(52) U.S. Cl.
CPC .......... *G06F 3/0608* (2013.01); *G06F 3/0644* (2013.01); *G06F 3/0661* (2013.01); *G06F 3/0664* (2013.01); *G06F 3/0673* (2013.01); *G06F 9/445* (2013.01); *G06F 12/08* (2013.01);
(Continued)

(58) Field of Classification Search
CPC .................. G06F 2212/401; G06F 12/023
See application file for complete search history.

(56) References Cited

U.S. PATENT DOCUMENTS

| | | | |
|---|---|---|---|
| 5,617,552 A | 4/1997 | Garber et al. | |
| 5,699,539 A | 12/1997 | Garber et al. | |
| 5,844,575 A | 12/1998 | Reid | |

(Continued)

FOREIGN PATENT DOCUMENTS

WO    9637846 A1    11/1996

OTHER PUBLICATIONS

IBM: List of IBM Patents or Patent Applications Treated as Related (Appendix P), Jun. 10, 2015, pp. 1-2.

(Continued)

*Primary Examiner* — David X Yi
*Assistant Examiner* — Arvind Talukdar
(74) *Attorney, Agent, or Firm* — Michael A. Petrocelli

(57) ABSTRACT

A method for setting a compression ratio for utilizing a compressed memory pool (which is backed by pinned memory) by a virtual memory manager (VMM). Compression of pages of corresponding segments can be tracked as part of a VMM paging algorithm that compresses pages to store in a compressed memory pool. A segment having pages with an average compression ratio below a threshold is identified. The identified segment pages are prevented from utilizing the compressed memory pool resulting in optimizing the use of the compressed memory pool.

2 Claims, 4 Drawing Sheets

(52) U.S. Cl.
CPC .......... *G06F 2212/1044* (2013.01); *G06F 2212/401* (2013.01)

(56) References Cited

U.S. PATENT DOCUMENTS

| | | |
|---|---|---|
| 6,000,009 A | 12/1999 | Brady |
| 6,523,102 B1 | 2/2003 | Dye et al. |
| 7,089,391 B2 | 8/2006 | Geiger et al. |
| 7,587,572 B1 | 9/2009 | Stenstrom |
| 8,417,912 B2 | 4/2013 | Olszewski et al. |
| 8,639,909 B2 | 1/2014 | Olszewski et al. |
| 8,645,338 B2 | 2/2014 | Barsness et al. |
| 9,176,858 B2 | 11/2015 | Jin et al. |
| 9,176,889 B1 | 11/2015 | Earhart, III |
| 2010/0161567 A1 | 6/2010 | Makela |
| 2013/0006948 A1 | 1/2013 | Shmueli |
| 2014/0075137 A1 | 3/2014 | Shin |
| 2015/0301946 A1* | 10/2015 | Guo .............. G06F 9/45558 711/6 |
| 2016/0078045 A1* | 3/2016 | Ebsen ............ G06F 17/30153 707/693 |

OTHER PUBLICATIONS

U.S. Appl. No. 14/576,255, filed Dec. 19, 2014, entitled: "Method to Improve Page Out Mechanism With Compressed Memory Pools", pp. 1-25.

Pending U.S. Appl. No. 14/576,255, filed Dec. 19, 2014, entitled: "Method to Improve Page Out Mechanism With Compressed Memory Pools", pp. 1-25.

\* cited by examiner

METHOD TO IMPROVE PAGE OUT MECHANISM WITH COMPRESSED MEMORY POOLS

BACKGROUND

Virtual memory can be used in a memory management technique which can use virtual memory management (VMM). Active Memory Expansion (AME) is a technique in VMM where computational pages are compressed and kept in a separate address space (which is known as a compressed memory pool) when pages are selected to be paged-out. The pages sent (paged-out) to the compressed memory pool are not paged out to disk-paging space. The compressed memory pool provides an effective way to retrieve (page-in) pages by decompressing them from the compressed memory pool. The compressed memory pool is backed by pinned memory which continues to grow when more pages are paged-out to the compressed memory pool. If the compressed memory pool has reached a storage limit, then subsequent pages can be paged-out to disk-paging space.

SUMMARY

According to an aspect of the present invention, a method sets a compression ratio for utilizing compressed memory by a virtual memory manager (VMM). Compression of pages of corresponding segments are tracked as part of a VMM paging algorithm that compresses pages to store in a compressed memory pool. A segment having pages with a compression ratio below a threshold is identified. The identified segment pages are prevented from utilizing the compressed memory pool.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
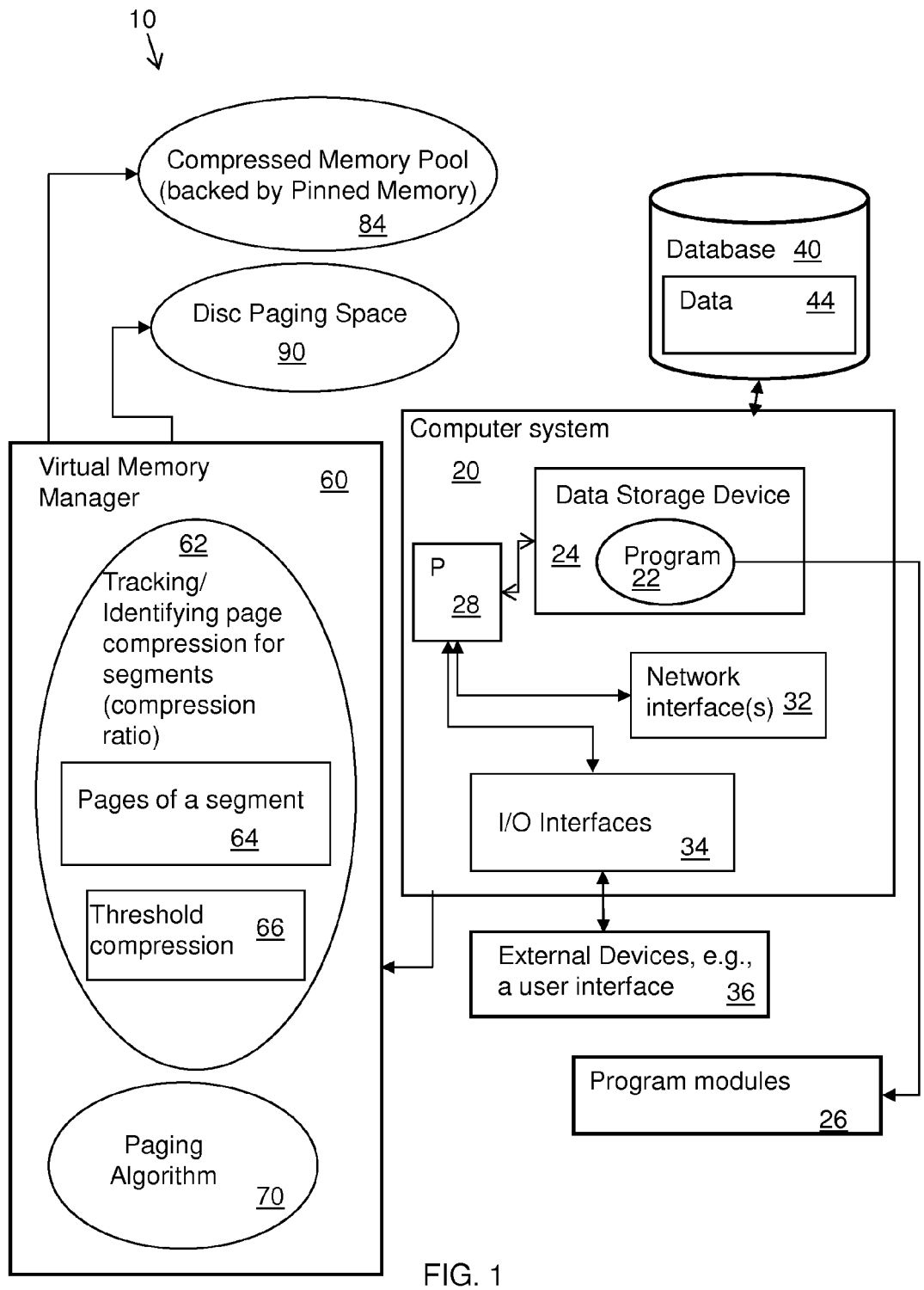
FIG. 1 is a schematic block diagram illustrating an overview of a system and methodology for setting a compression ratio for utilizing a compressed memory pool by a virtual memory manager (VMM) according to an embodiment of the disclosure.
Figure 2:
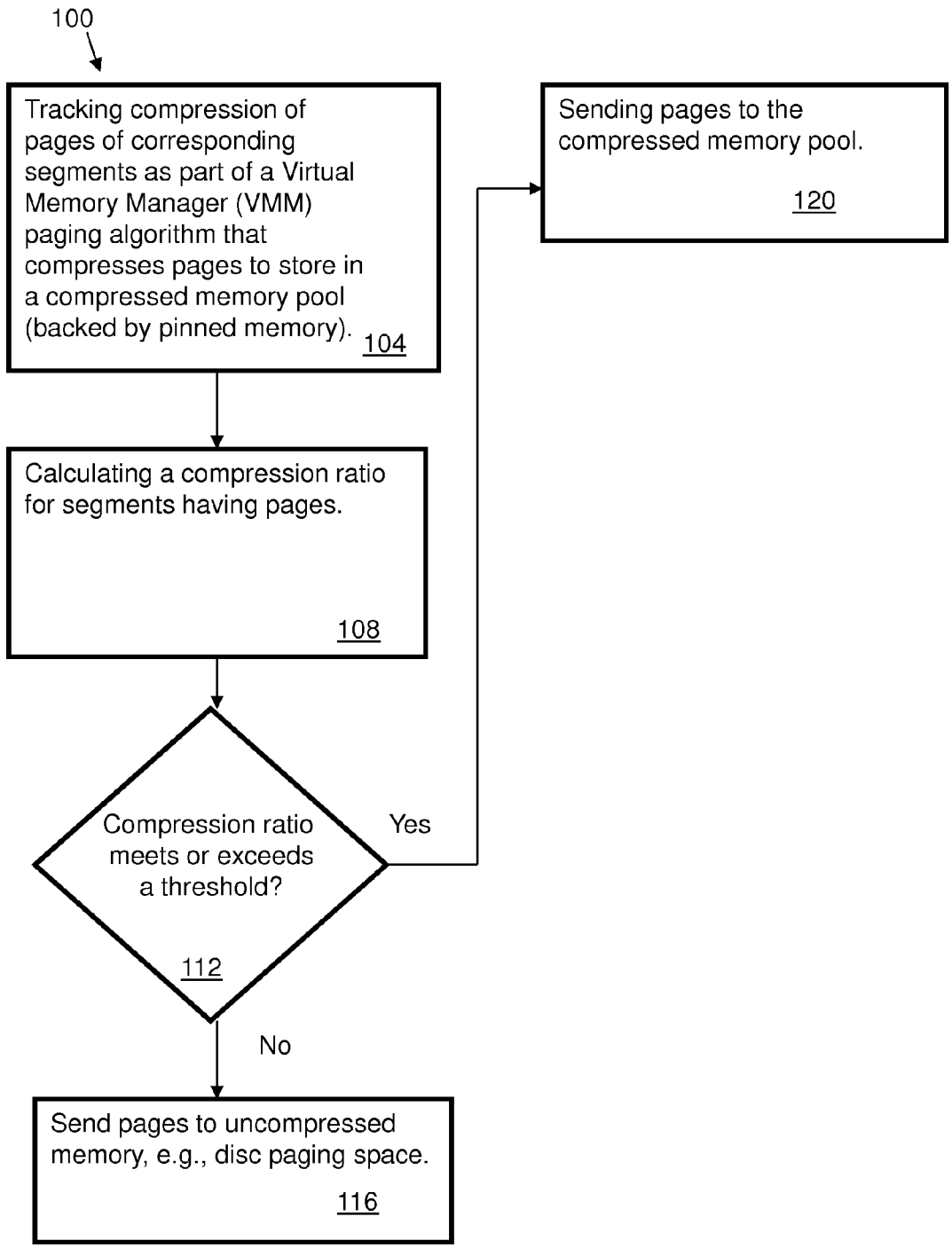
FIG. 2 is a flow chart illustrating a method for setting a compression ratio for effectively utilizing a compressed memory pool by a virtual memory manager (VMM) based on FIG. 1 according to an embodiment of the disclosure.

Referring to FIGS. 1 and 2, a system 10 and method 100 for setting (or ensuring) a compression ratio for utilizing a compressed memory pool by a virtual memory manager (VMM) 60. The method 100 includes tracking (or identifying) compression of pages 62 of corresponding segments as part of a VMM paging algorithm 70 that compresses pages to store in a compressed memory pool 84 (also referred to as compressed memory) which is backed by pinned memory, as in block 104.

The method includes identifying one or more segments having pages 64 with a compression ratio below a threshold 66, as in block 108. The nonconforming pages are prevented from utilizing compressed memory. The nonconforming pages, i.e., segments of pages not meeting or exceeding the threshold (block 112), can be sent to uncompressed memory such as disc paging space 90, as in block 116, instead of a compressed memory pool (which is backed by pinned memory) 84. The conforming pages, i.e., segments of pages meeting or exceeding the threshold (block 112), can be sent to the compressed memory pool 84, as in block 120.

The method 100 may be embodied in a program 22 embodied on a computer readable storage device, e.g., data storage device 24. The program 22 is executable by a processor 28 of a computer system 20 (to execute program steps, code, or program code). Additional data storage may also be embodied as a database 40 including data 44. The program or executable instructions may be offered as a service by a provider. The computer 20 and program 22 shown in FIG. 1 are generic representations of a computer and program that may be local to a user, or provided as a remote service, such as a website accessible using a network (e.g., interacting with the Internet or cloud services). It is understood that the computer 20 also generically represents herein a computer device or a computer included in a device, such as a laptop or desktop computer, etc., or one or more servers, alone or as part of a datacenter. The computer system 20 can include a network interface 32, and input/output (I/O) interface(s) 34. The I/O interface 34 allows for input and output of data with an external device 36 that may be connected to the computer system. The network interface 32 may provide communications between the computer system and a computer network. The method steps and system components and techniques may be embodied in modules of the program 22 for performing the tasks of each of the steps of the method and system, which are generically represented in FIG. 1 as program modules 26. The program 22 and program modules 26 can execute specific steps, routines, sub-routines, instructions or code, of the program.

The present disclosure provides a system and method for tracking the compressibility (e.g., compression factor or ratio) of pages belonging to segments which are sent to a compressed memory pool. If, over a period of time it is found that pages belonging to a particular segment are not meeting a compression threshold (i.e., not being compressed enough, including not having a compression factor or ratio meeting a threshold), pages of these segments can be paged-out to disk-paging space rather than pushed into the compressed memory pool (which is backed by pinned memory). The above mechanism is followed because data-pages belonging to a segment can have similar compression characteristics.

The specified amount of pages of a segment to page-out to determine a compression ratio for the segment can be set, for example, five percent or above of the a total number of pages in the segment.

In another example, the threshold compression ratio can be fifty percent compressibility for the pages. It is understood that the threshold is configurable to a desired number/compression ratio.

A compressed memory pool is another form of a paging device. Pages selected to be paged-out can first be sent to a compressed pool. When the compressed pool has reached a pinned limit (e.g., a system pinned memory threshold), subsequent page-out pages can be sent to disk paging space.

When a page is compressed and prepared to be part of the compressed pool, a compression factor of the page can be determined and marked (for example, at a location that describes each virtual page). After a threshold number of pages of the segment have been compressed, a scan can determine how many pages had a compression ratio meeting a threshold value. Depending on the pattern of compression ratios, the segment can be marked for its pages to be paged-out to a compressed memory pool, or to disk-paging space if the compression ratio does not meet the threshold value. When the segment is marked uncompressible (for not meeting the threshold value), it can be advantageous to send the pages directly to disk-paging space rather than occupying pinned memory of a compressed pool. Alternatively, if the compressibility or compression ratios meet or exceed the threshold value, the segment can be marked for using a compressed memory pool (e.g., marked compressible).

In the present disclosure, once a segment is marked for either meeting the compressibility threshold (compressible), or not meeting the compressibility threshold (uncompressible), the pages of the segment can go to the compressed-pool when meeting or exceeding the compressibility threshold. The pages of the segment can go to disk paging space when not meeting the compressibility threshold.

Some of the VMM (Virtual Memory Manager) commands can be extended to give a compression ratio of the segments as a report. A system administrator can go though the data of the report to see if segments of certain processes do not have adequate compression ratios (that is, do not meet the compressibility threshold and thereby are not a good candidate to be part of the compressed pool), or vice-versa. The system administrator can mark segments not meeting the compressibility threshold as uncompressible. Segments marked not to be compressed can be marked VM_UNCOM (as uncompressible pages), and segments marked to be compressed can be marked VM_COM (as compressible pages). For segments which do not meet the compressibility threshold and are to be paged-out to disk paging space, the VMM can optionally not attempt to re-compute the compressibility.

Depending on how the segment has been marked by the administrator, the VMM can either send the page to the compressed memory pool, or directly to the disk paging space. The above methodology results in a compressed memory pool having pages with acceptable compression ratios (meeting or exceeding the compressibility threshold). Other pages which are part of the disk-paging space avoid utilizing pinned memory, which may be better used when managing system resources.

Determination of Compressibility of Segment

One embodiment for determining compressibility of a segment is discussed below. After a predefined number of pages in a segment are paged-out (for example, five percent or above of the total number of pages in the segment), an average compressibility is computed using the compressibility of each paged-out page of the total number of pages. The average compressibility of a segment can then be used to determine if the segment should be marked as compressible (VM_COM), that is, meeting or exceeding the compressibility threshold, or uncompressible (VM_UNCOM) that is, not meeting the compressibility threshold.

Figure 3:
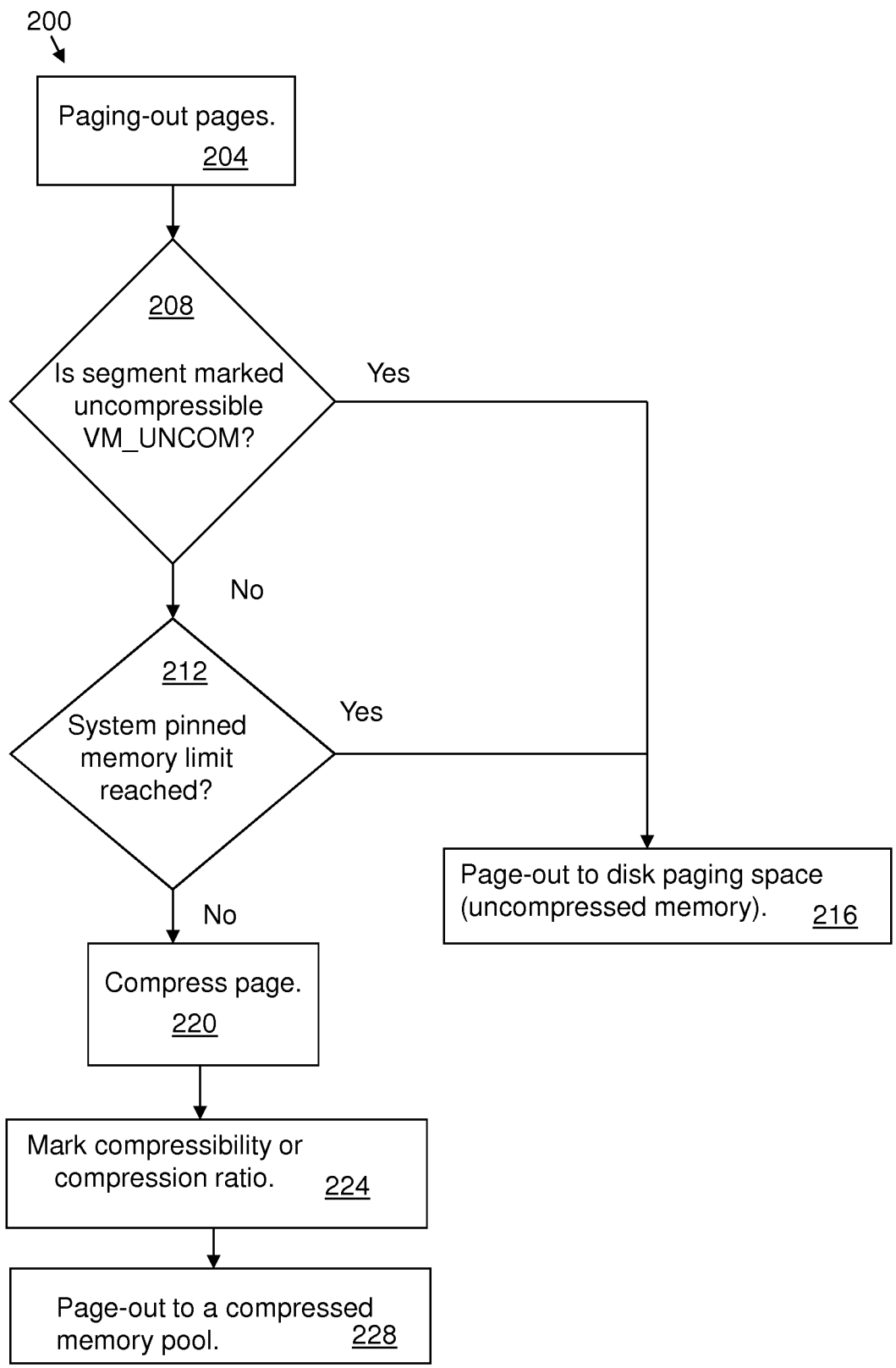
FIG. 3 is a flow chart illustrating a method according to an embodiment of the disclosure depicting more detail in relation to FIG. 2.

Referring to FIG. 3, a method 200 according to an embodiment of the present disclosure determines whether to compress pages of a segment, determine a compression ratio, and send the pages to a compressed memory pool. Pages of a segment are paged-out as in block 204. A determination is made whether the segment is marked uncompressible (VM_UNCOM), as in block 208. When the segment is marked uncompressible, the pages of the segment are sent to (paged-out) to disk paging space 90, as in block 216.

The method 200 determines whether a system pinned memory limit has been reached (block 212). When the system pinned memory limit is reached, the method continues to block 216 to page-out to disk paging space 90 (an uncompressed memory pool).

When the system pinned memory limit is not reached, the pages of the segment are compressed, at block 220. The compressibility is marked and information about each page can be stored at a location to record the compressibility or compression ratio of each page, as in block 224. The pages can then be paged-out to a compressed memory pool 84 (backed by pinned memory), as in block 228.

Figure 4:
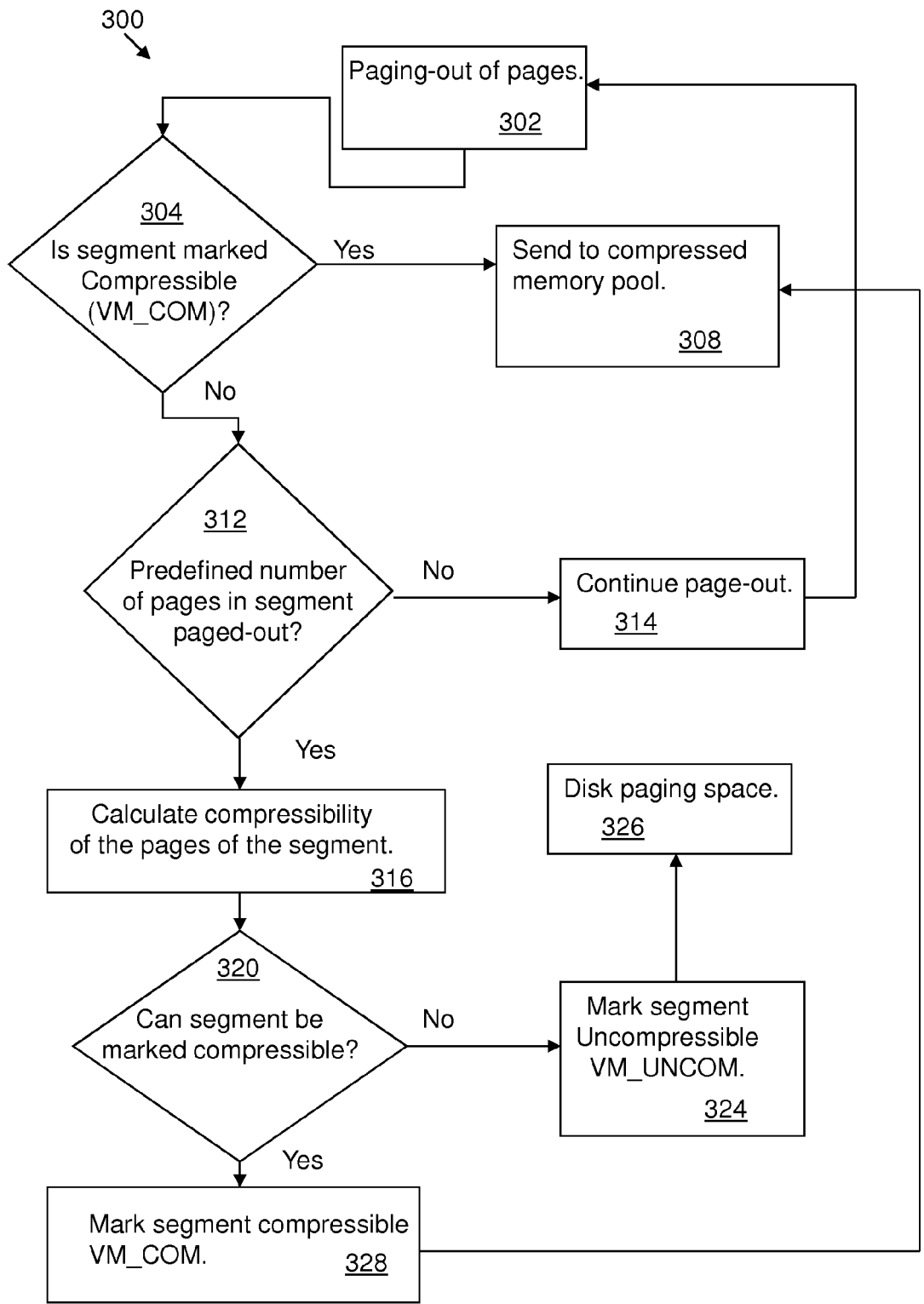
FIG. 4 is a flow chart illustrating a method according to an embodiment of the disclosure depicting more detail in relation to FIGS. 2 and 3.

Referring to FIG. 4, an embodiment of a method 300 (which is a sub-process to the method 200) for marking a segment as compressible or uncompressible is discussed. In the method 300 pages are paged-out, as in block 302. If a segment is marked compressible (e.g., VM_COM), then the method send pages to a compressed memory pool (block 308). When the segment is not marked compressible (block 304), it is determined whether a predefined number of pages in the segment are paged-out, as in block 312. If the predefined number of pages are not paged-out, then the method continues the paging out of the pages as in block 314.

When the predefined number of pages in a segment are paged-out, the method proceeds to calculate compressibility of the pages of the segment, as in block 316. The method can set a threshold compressibility for marking a segment as compressible. If the compressibility of the segment is below the threshold, the segment can be marked as uncompressible, and if the compressibility of the segment meets or is above the threshold, the segment can be marked as compressible. If the segment can be marked compressible (block 320), then the segment is marked compressible (for example, VM_COM), as in block 328, and the method proceeds to send the pages to a compressed memory pool, as in block 308. If the segment can not be marked compressible (block 320), then the segment is marked uncompressible (for example, VM_UNCOM) as in block 324, and the pages are sent to disk paging space, as in block 326.

The compressibility of the pages of a segment can be represented as a compression ratio. The compression ratio can be identified for each compressed page in a descriptor for the page. The descriptors for pages in a segment can be used to determine an aggregated compression ratio for the segment. According to a method of the present disclosure, responsive to identifying a criteria for the pages in the segment (e.g., a threshold compression or compression ratio), the segment can be marked for using a compression memory pool (backed by pinned memory), or not using the compression memory pool (e.g., using disk paging space). The method can monitor compressibility of pages for a segment, and provide commands to mark segments of a process for using (or not using) compressed memory pools.

The method 300 referred to in FIG. 4 can also refer to, in an alternative embodiment, a background program, such as a daemon, which can run in the background as a low priority. The daemon can scan segments for compressibility by analyzing the segments and ascertaining whether a threshold for compressibility has been met. For example, the daemon can determine the compressibility of segments which have not been marked as compressible or uncompressible based on a threshold criterion. The daemon can then mark unmarked segments as compressible or uncompressible based on its analysis.

Referring to FIG. 1, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The embodiments, features, and instructive examples described above are illustrative, and should not be construed to limit the present disclosure to the particular embodiments or enumerated examples. Thus, various changes and modifications may be effected by one skilled in the art without departing from the spirit or scope of the disclosure as defined in the appended claims.

What is claimed is:

1. A method for setting a compression ratio for utilizing compressed memory by a virtual memory manager (VMM), comprising:
    tracking compression of pages of corresponding segments as part of a VMM paging algorithm that compresses pages to store in a compressed memory pool;
    identifying a segment having pages with a compression ratio below a threshold;
    preventing the identified segment pages from utilizing the compressed memory pool;
    sending the identified segment pages to disk paging space;
    sending the non-identified segment pages having a compression ratio meeting or exceeding the threshold to the compressed memory pool;
    specifying an amount of pages in the segment to page-out to the compressed memory pool, wherein the specified amount of pages is at least five percent of a total number of pages in the segment, and the amount of pages in the segment to page-out being less than a total amount of pages of the segment;
    after the specifying of the amount of pages in the segment to page-out, calculating the compression ratio based on the paged-out pages of the segment by:
        calculating an average compression ratio of the pages based on the paged-out pages of the segment;
        marking the segment as uncompressible when the specified amount of pages have an average compression ratio below the threshold;
        marking the segment as compressible when the specified amount of pages have an average compression ratio meeting or exceed the threshold;
    determining when a memory threshold is met for the compressed memory pool which indicates that the compressed memory pool cannot accept pages for compression, and determining the memory threshold not being met which indicates that the compressed memory pool can accept pages for compression;
    sending the pages of the segment marked uncompressible to the disk paging space when either the memory threshold is met and when the memory threshold is not met, thereby always sending the pages of the segment marked uncompressible to the disk paging space; and
    sending the pages of the segment marked compressible to the compressed memory pool when the memory threshold has not been met.

2. The method of claim 1, wherein the threshold compression ratio is fifty percent compressibility for the pages.

* * * * *